United States Patent [19]

Watase

[11] Patent Number: 4,569,882
[45] Date of Patent: Feb. 11, 1986

[54] THERMOPLASTIC SYNTHETIC RESIN-COVERED METAL WIRE

[76] Inventor: Hideo Watase, 3-19-2, Tamadaira Hino-shi, Tokyo, Japan

[21] Appl. No.: 561,742

[22] Filed: Dec. 15, 1983

[51] Int. Cl.$^4$ .................................................. B32B 7/02
[52] U.S. Cl. ..................................... 428/216; 428/375; 428/378; 428/379; 428/458
[58] Field of Search ............... 428/375, 378, 379, 215, 428/213, 216, 458

[56] References Cited

U.S. PATENT DOCUMENTS

| | | | |
|---|---|---|---|
| 3,538,186 | 12/1970 | Payette | 428/379 |
| 4,081,427 | 3/1978 | Lange | 428/379 |
| 4,446,195 | 5/1984 | Rieder et al. | 428/379 |

FOREIGN PATENT DOCUMENTS

| | | | |
|---|---|---|---|
| 52-68983 | 6/1977 | Japan | 428/379 |
| 54-65879 | 5/1979 | Japan | 428/379 |

*Primary Examiner*—Edith Buffalow
*Attorney, Agent, or Firm*—Pearne, Gordon, Sessions, McCoy, Granger & Tilberry

[57] ABSTRACT

The invention relates to a metal wire closely covered with a layer 5 to 100 micron thick of a polyethylene iso-terephthalate copolymer containing from 5 to 30 mol % of isophthalic acid component and having an intrinsic viscosity of from 0.7 to 1.0.

3 Claims, No Drawings

THERMOPLASTIC SYNTHETIC RESIN-COVERED METAL WIRE

FIELD OF THE INVENTION

The present invention relates to a thermoplastic synthetic resin-covered metal wire. More particularly, the present invention relates to a metal wire closely covered with a layer of a specified thickness of a polyethylene iso-terephthalate copolymer having a specified intrinsic viscosity and a specified composition.

BACKGROUND ART

It is well known to cover a metal wire with a thermoplastic resin. A PVC-covered or polyethylene-covered wire is widely used for a variety of purposes including, for example, conductors, wires, fences and general merchandise such as a hanger. Since vinyl chloride and polyethylene are lacking in toughness and weather resistance, it is necessary to cover the metal wire with a layer of at least 1 mm in thickness. It is well known that the film of polyethylene terephthalate polymer is tough. There is described in the specification of U.S. Pat. No. 3,829,545 a method comprising covering a metal wire with a film, 0.1 to 0.3 mm thick, of polyethylene terephthalate. However, thinner covering is desirable for various applications. For example, when it is intended to use the covered metal wire for motor windings, much thinner covering is strongly required to reduce the weight. Prior to the present invention, however, it has not been the practice to cover a metal wire with a thin thermoplastic resin film which is as thin as 10 to 80μ.

It is an object of the present invention to provide a thermoplastic resin-covered metal wire in which the metal wire is closely covered with a resin film which is tough and thinner than those of conventional metal wires.

DISCLOSURE OF THE INVENTION

According to the present invention, there is provided a metal wire closely covered with a layer, 5 to 100μ thick, of a polyethylene iso-terephthalate copolymer containing from 5 to 30 mol % of isophthalic acid component and having an intrinsic viscosity of from 0.7 to 1.0.

The polyethylene iso-terephthalate copolymer which constitutes a cover layer of the present invention is a polymer which contains from 5 to 30 mol % of isophthalic acid and has an intrinsic viscosity of from 0.7 to 1.0. The polymer of the present invention can be prepared by any of the conventional methods such as an ester exchange reaction or a solid-phase polymerization method. When the amount of the isophthalic acid component is insufficient, the melt flow characteristics of the resulting polyethylene terephthalate polymer are too poor to obtain a thin cover layer, and the adhesion of the polymer to the metal wire is also poor. When the amount of the isophthalic component is too increased, the resulting polymer is lacking in stickness during melting, and the cover layer becomes brittle. Generally, the amount of the isophthalic acid component should be within the range of from 5 to 30 mol %, preferably from 8 to 20 mol %. In order to form a cover layer of from 5 to 100μ in thickness, the intrinsic viscosity of the polymer must be within the range of from 0.7 to 1.0.

Examples of said metal wires are iron and copper ones. Preferably, the surface of the metal wire is kept clean, for example, by abrading it, and then a covering treatment is conducted. The covering of the wire may be conducted by any of conventional methods such as a tube method and a pressurization method. For example, a metal wire delivered from a wire delivery machine is previously heated at a temperature of preferably from 180° to 270° C., supplied to an extruder and passed through a crosshead for wire covering to cover the metal wire with the polymer which is heated at a temperature (melting point) of from 20° to 50° C. and extruded in a plasticized state from the extruder. The resulting covered wire is cooled, for example, by passing it through a water bath, and then taken up. The thickness of the cover layer can be adjusted by controlling the extrusion rate of the polymer and the take-up speed of the metal wire. In this way, there can be obtained a metal wire closely covered with a tough film of from 5 to 100μ in thickness.

The following example further illustrates the present invention.

EXAMPLE 1

The surface of an iron wire having an outer diameter of 1 mm was abraded. The iron wire was heated at a temperature of about 240° C. by means of a burner, and then passed through the crosshead of an extruder to cover the iron wire with a polyethylene iso-terephthalate polymer which was melt-extruded at 280° C. in a tubular form from the crosshead, said polymer containing 10 mol % of copolymerized isophthalic acid component and having an intrinsic viscosity of 0.91. Water was poured onto the resulting covered iron wire which was then cooled by passing it through a waster bath and taken up at a speed of 10 m/minute. The cover layer was substantially in an amorphous state. The film thickness of the cover layer was 15μ. The film was firmly welded to the surface of the metal wire. Its adhesion was not damaged even when the covered wire was bent.

I claim:

1. A metal wire closely covered with a layer 5 to 100μ thick and extruded directly thereon, said layer comprising a polyethylene iso-terephthalate copolymer consisting of from 5 to 30 mol % of isophthalic acid component and from 95 to 70 mol % of copolymerized terephthalic acid component, and having an intrinsic viscosity of from 0.7 to 1.0.

2. A metal wire closely covered with a layer 5 to 100μ thick and extruded directly thereon, said layer comprising a polyethylene iso-terephthalate copolymer consisting of from 8 to 20 mol % of isophthalic acid component and from 92 to 80 mol % of copolymerized terephthalic acid component, and having an intrinsic viscosity of from 0.7 to 1.0.

3. A metal wire closely covered with a layer 5 to 100μ thick and extruded directly thereon, said layer comprising a polyethylene iso-terephthalate copolymer consisting of from 5 to 30 mol % of isophthalic acid component and from 90 to 70 mol % of copolymerized terephthalic acid component, and having an intrinsic viscosity of from 0.85 to 0.95.

* * * * *